Jan. 20, 1959　　　　　G. SCHMIDT　　　　2,869,859
DEVICE FOR CONTROLLING HATCH-COVERS AND LIKE PANELS
ON SHIPS, RAILWAY-CARS AND THE LIKE WITH THE
ASSISTANCE OF AN ENDLESS, DRIVEN CHAIN
Filed July 23, 1957　　　　　　　　　　3 Sheets-Sheet 1

Jan. 20, 1959  G. SCHMIDT  2,869,859
DEVICE FOR CONTROLLING HATCH-COVERS AND LIKE PANELS
ON SHIPS, RAILWAY-CARS AND THE LIKE WITH THE
ASSISTANCE OF AN ENDLESS, DRIVEN CHAIN
Filed July 23, 1957  3 Sheets-Sheet 2

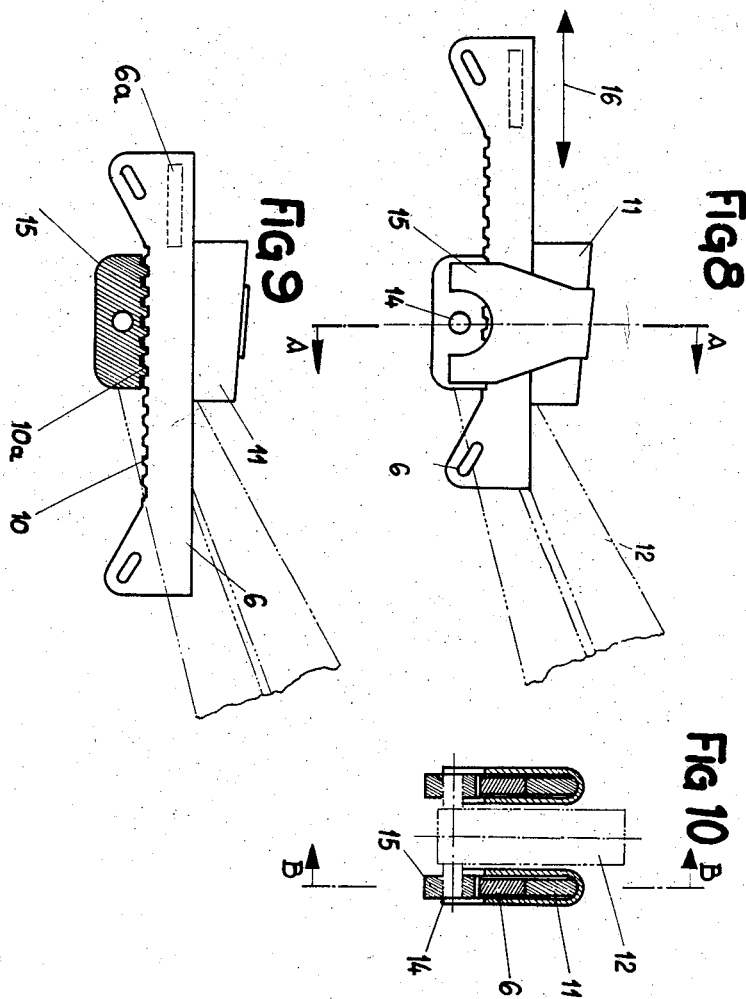

# United States Patent Office 2,869,859
Patented Jan. 20, 1959

2,869,859

DEVICE FOR CONTROLLING HATCH-COVERS AND LIKE PANELS ON SHIPS, RAILWAY-CARS AND THE LIKE WITH THE ASSISTANCE OF AN ENDLESS, DRIVEN CHAIN

Gunter Schmidt, Bremen, Germany, assignor to International MacGregor Organization (I. M. G. O.), Casablanca, Morocco, a corporation of Morocco Application July 23, 1957, Serial No. 673,696

Claims priority, application France August 16, 1956

11 Claims. (Cl. 268—18)

Mechanically-operated hatch-covers or panels for closing hatchways and like apertures are already known in ship- and railway construction. As a rule, these hatches or panels consist of separate members, for example of steel, movable on rails or runways provided on either side of the hatchways and are usually adapted to be stacked or stowed at one end of the hatchways. To bring the hatches or covers from their closed position to their open position, that is, to the stowage or stacking position, and vice versa, mechanically-operated pull ropes, cables or chains are used.

For separate hatchways it is also known to provide on either side of the aperture an endless chain for controlling the different closing members or covers.

Now it is the object of this invention to create, for ships or the like having a plurality of hatchways or like apertures aligned in succession, a control device which is both simple in design and safe in operation, while permitting the selective opening and closing of any desired hatchways at will.

This problem is solved by the present invention by using an endless control chain extending alongside a plurality of hatchways, means whereby the driven elements of the hatch-covers associated with each hatchway may be detachably connected to the control chain, as well as other means whereby the detachable driving connection between the control chain and each hatch-cover may be so adjusted as to provide a uniform application of the driving force and prevent any deflection or side sway of the hatch-covers.

According to this invention the driven or controlled element or hatch-cover of the group of hatch-covers associated with a hatchway is provided with a driving member connected through a detachable chain to the control chain. The intermediate chain is detachable by virtue of a link. These driving members are mounted preferably on a carriage arranged in an adjustable manner on one side of the hatch-cover, and they are provided with means for adjusting and anchoring them relative to the carriage.

In an installation comprising hatch-covers adapted to be stowed by tilting about a transverse axis, the carriage is disposed at the free end of a driving arm rigidly secured on the sides of the driven hatch-cover element.

In a preferred embodiment of this invention the driving member is a bar of preferably rectangular cross-section which is adapted to slide longitudinally in the carriage and carries a set of teeth adapted to mesh with corresponding teeth provided on the carriage. Means are also provided for locking the driving member in each selected position, for example by means of a wedge or key member.

The driving member may also consist of a rod stud or bolt having a screw-threaded portion and adapted to slide axially in the carriage and to be locked relative thereto. This rod stud or bolt may engage for example a tapped hole in the carriage and be locked therein by means of a nut. Besides, it may be sufficient to provide a pair of nuts located against the respective front faces of the carriage provided with a plain hole, or any similar device.

If desired, the driving member may consist of a detachable structure having notches formed therein which correspond in shape to the teeth of a chain sprocket and are adapted to be engaged by the chain operatively or drivingly connecting the hatch-cover concerned with the control chain, so that this intermediate chain may be displaced therein pitch by pitch or tooth by tooth.

Preferably, the element providing the coupling or connection with the driving chain will consist of a junction member extending through the links and engageable on either side of the control chain by a chain ensuring the necessary connection with driving member. Each chain may then actuate a separate driving member. The aforesaid junction member will be preferably of curved configuration, its internal radius being consistent with the outer radius of the chain element.

In a construction comprising driving arms permanently secured to the operative or driven hatch-cover of the set or group of hatch-covers closing a given hatchway, the fulcrum or pivot pin about which the carriage is pivoted or tilted at the end of these arms will preferably be so positioned that the traction component of the connecting chains will be substantially in the direction of movement of the control chain, so that the latter will not be lifted to any appreciable extent. Moreover, this fulcrum will be so located that its position relative to the control chain will not vary to any appreciable extent in the vertical direction, even during the tilting of the hatch-cover as the latter is moved to its stowage position.

By releasing the coupling according to this invention it becomes possible to connect at will either separate hatch-cover elements or all the hatch-covers to the endless control chain for closing or opening the hatchways. If a plurality of hatchways are opened or closed simultaneously it is necessary of course to have the control movement transmitted in a uniform and simultaneous manner to each or all of the hatch-covers concerned. Now it is another object of this invention to provide means for adjusting and re-adjusting in any desired manner the driving connections in order to comply with this specific requirement.

The invention will be better understood if reference is made to the attached drawings forming part of this specification and illustrating diagrammatically by way of example a few embodiments of the invention. In the drawings:

Figure 8 illustrates on a larger scale the driving carriage with its driving member and locking wedge;

Figure 9 is a longitudinal section illustrating the driving carriage, the section being taken upon the line B—B of Figure 10; and Figure 10 is a section taken upon the line A—A of Figure 8.

Figure 1:
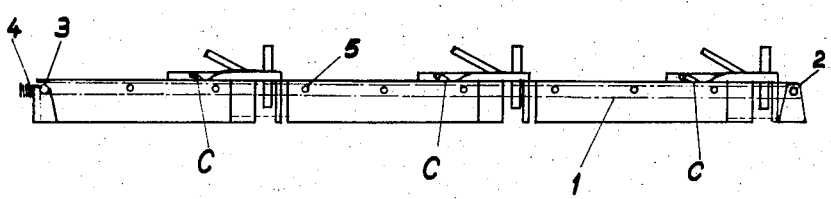
Figures 1 to 3 illustrate in diagrammatic lateral elevational views the arrangement according to this invention for controlling three groups of adjacent hatch-covers by means of an endless chain, these three figures illustrating different operating steps obtainable without difficulty with this invention.

In the embodiment illustrated in Figures 1 to 4 the endless control chains are driven from sprockets 2 mounted on the output shaft of a power winch. The opposite chain support 3 consisting of a simple pulley is displaceable by means of a tightener 4 associated with this support for adjusting the chain tension. The upper reach of the control chains, to which the hatch-cover elements are connected through the arrangement forming the subject-matter of this invention, is supported at spaced intervals by guide pulleys or rollers 5 so as to keep this upper reach as horizontal as possible along the complete hatchway assembly.

In the embodiment illustrated in Figures 1 to 4, it is assumed that each of the three groups of hatch-covers illustrated consists of three elements or hatches I, II, III of which only the first element I is operated by the device. Consequently, this element I may be considered herein as the driven or operative element of the hatch-cover. The general principles of this specific arrangement are described and illustrated in Patent No. 2,641,214. This element I is connected to the control chain 1 through a coupling and adjustment device designated generally by the reference letter C.

Figure 2:
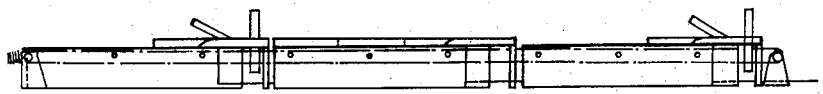
Figure 3:
Figure 4:
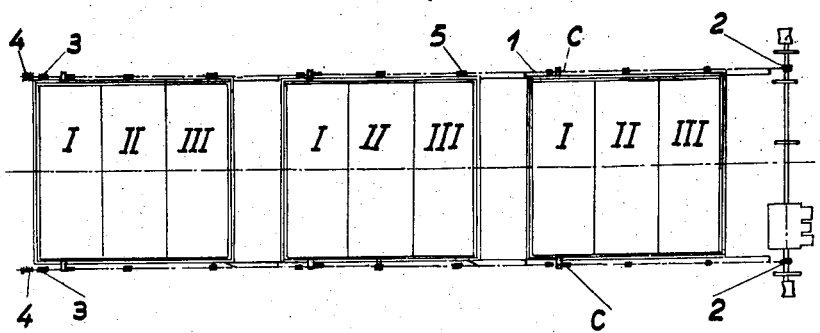
Figure 4 shows the complete assembly in diagrammatic plane view.

Figures 1 to 3 show how the most different movements may be imparted to several hatch-covers through a simultaneous control utilizing an ordinary endless chain.

In Figure 1 three hatch-covers are simultaneously connected to the endless chain 1. The opening and closing operation illustrated diagrammatically takes place simultaneously and in parallel in the three hatch-covers.

In the embodiment illustrated in Figure 2 it is assumed that the central hatch-cover had to remain closed; consequently, the connecting chains 7 have been disconnected from the control chain 1. As a result, the operation of the main chain 1 will open or close only the first and third hatchways.

Finally, in the arrangement shown in Fig. 3 it is assumed firstly that only the driven element of the central hatch-cover was connected to the control chain and that this central hatch-cover was opened. Then, the next hatch-cover on the left of the figure was connected through connecting chains 7 to the control chain 1, whereas the hatch-cover of the right-hand hatchway remained closed. Figure 3 shows the operation consisting in opening the left-hand hatch-cover elements. These three examples show clearly that with this invention it is possible to contemplate any desired combinations of movements by properly connecting the hatch-covers to be actuated through a single chain.

Of course, the invention is not limited to the hatchway structures described hereinabove and illustrated in Figures 1 to 4 of the drawings, as it is also applicable to folding hatch-covers as well as to the closing of hatchways wherein the hatch-covers simply roll on one side.

The necessary adjustments of the different hatch-covers relative to the common control member 1 may be made without difficulty by using the adjustment means to be described presently.

Referring more particularly to Figures 5 to 10 of the drawings a coupling device C will now be described. The function of this coupling device is to connect the driven or operative hatch-cover element of each hatchway which is to be actuated from the main common endless chain 1 in a detachable, adjustable manner.

The driving arm 12 has one end secured to a shaft 13 rigid with the driven element of the hatch-cover. The other end of the arm 12 is permanently connected to the pin 14 constituting a pivot about which the carriage 15 is adapted to rotate; this carriage 15 comprises two halves disposed on either side of the arm 12. In each carriage half, a driving member 6 is mounted for longitudinal adjustment. In view of this longitudinal adjustment the driving members 6 are provided on their lower faces with racks 10 normally engaged by corresponding teeth 10a carried by the carriage 15 when a wedge member 11 is inserted between the driving members 6 and a strap portion of the carriage 15. Thus, when the wedge member 11 is released the carriage 15 may be displaced along these driving teeth 10 in the direction of the double arrow 16 (Figures 6 and 8) relative to the driving members 6.

A transverse connecting bar 6a is provided across the pair of driving members 6 for producing a uniform drive.

The end portions of the driving members 6 are connected through connecting chains 7 and links 9 to coupling members 8 extending through one element of the endless control chain 1. As clearly shown in the drawings it is possible, by releasing the connecting links 9, to modify the position of the coupling members 8 on the endless chain and therefore to either discontinue completely the transmission of motion to the driving members 6 or vary their longitudinal positions on the control chain 1.

Figure 5:
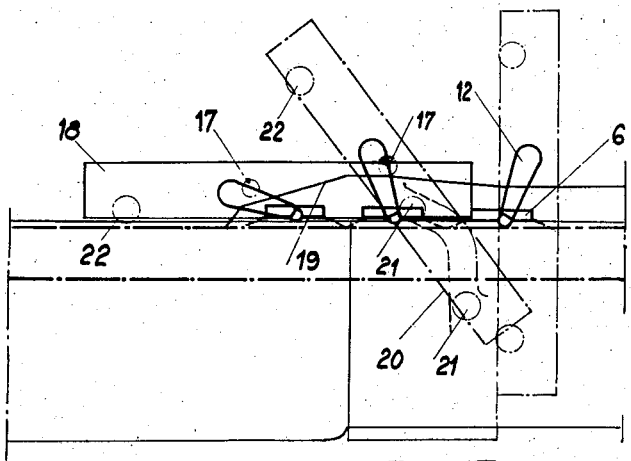
Figure 5 is another lateral diagrammatic elevation showing three positions of the movement effected by a driven hatch-cover when the latter attains its stowage position at the end of the hatchway.
Figure 6:
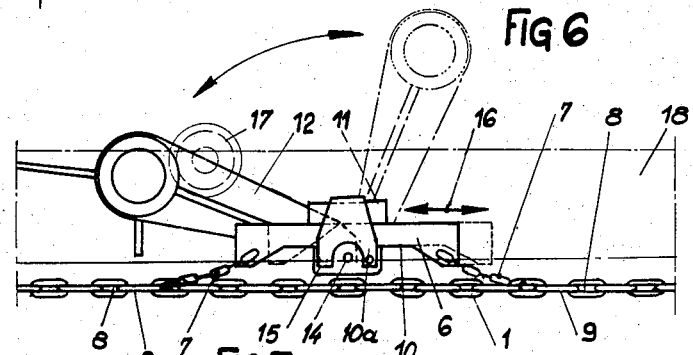
Figure 6 is a diagrammatic side elevational view showing the operative connection between the control chain and the hatch-cover.
Figure 7:
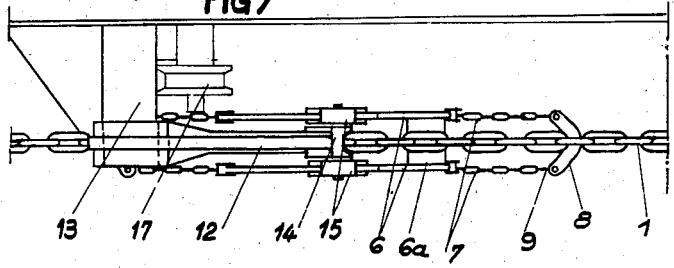
Figure 7 is a plane view corresponding to Figure 6.

In the vicinity of the driving shaft 13 is a roller 17 adapted, when the hatch-cover element 18 is at the stowage end of the hatchway, to start the tilting movement of the element carrying this shaft 13. In Figure 5 the hatch-cover element 18 is illustrated in three different positions. Thus, the thick lines show the element 18 in the position wherein the tilting roller 17 is just about to engage the oblique cam face of the guide ramp 19. In the oblique position illustrated in chain-dotted lines the element 18 is in its intermediate position wherein the element is still controlled by the front guide rollers 21 engaging a corresponding groove 20, and in the final vertical position the hatch-cover element 18 is also shown in chain-dotted lines. It is apparent that the carriage 15, as a consequence of the tilting mounting thereof on the pin 14 carried by the driving arm 12, will constantly remain horizontal, so that the hatch-cover element 18 may tilt freely.

When the endless control chain 1 moves in the opposite direction, the hatch-cover is tilted again but in the reverse direction from its vertical stowage position at the end of the hatchway to resume its horizontal position illustrated in thick lines wherein it bears on its front and rear rollers 21, 22 and is adapted to be easily pushed toward its closed position.

The possibility of adjustment provided by the racks and teeth 10 and 10a is advantageous more particularly for compensating possible differences between the port and starboard control on a ship, to avoid any deflection or obliqueness in the hatch-cover movement as may result from a different pull.

In Figures 8 to 10 of the drawings there is shown in chain-dotted lines the driving arm 12 having secured on its outer end the pin 14 on which the driving carriage 15 is pivoted. As illustrated more in detail in Figure 9, the carriage 15 is provided with a trapezoidal passage which, in vertical section (Figure 10) is of substantially rectangular configuration. On the lower portion of this passage the carriage is provided with a set of teeth 10a adapted to mesh with a corresponding set of teeth 10 formed under the driving member 6. The two sets of teeth are caused to engage each other by the wedge member 11 so that the driving member 6 is held against motion.

In Figure 8 the driving member 6 is shown in its extreme left-hand position and in Figure 9 it is in its extreme right-hand position. To move the driving member and thus compensate any possible difference between the lateral control devices the wedge 11 is released and the longitudinal position of the driving bar may then be adjusted. Finally this member is locked in its novel position by inserting the wedge 11.

As will be seen in Figure 10 the embodiment illustrated therein comprises two driving carriages 15 located on either side of the driving arm 12 and adatped to pivot about the pins 14 solid with the driving arm 12.

Of course, the invention is not limited to this typical embodiment. In many cases, for example, it may be sufficient to provide a single driving carriage. In addition, adjustment and driving means differing from those illustrated and described may be used without departing from the purpose of the invention.

Thus, for example, it is possible to connect the two ends of a simple chain to the control chain 1, with the assistance of chain links, and to arrange on the driving arm 12 a carriage consisting of a hinged structure with notches formed therein which have the configuration of sprocket teeth, so that the chain may be moved link by link in this structure so that the desired compensation may be obtained.

A practically continuous adjustment may also be obtained by using a screw rod mounted for example on a tubular carriage pivotally mounted in turn on the driving arm 12 or on the hatch-cover element. The carriage may also be provided with a tapped hole corresponding to the said screw-rod so that the adjustment may be effected by simply rotating the rod; in this case, the members are locked in the position of adjustment by means of a simple lock nut. However, since in many cases the rotation of the driving member during the adjustment is not convenient because the re-adjustment must be carried out when the chain is connected, it is advantageous to fit the screw rod in a smooth-walled cavity or plain hole and to effect the adjustment by means of two nuts, each engaging one front face of the carriage.

Of course, the invention is not limited to the embodiment shown and described herein as many modifications may be brought thereto without departing from the spirit and scope of the invention as set forth in the appended claims.

What I claim is:

1. Control device ensuring the closing and opening of panels and hatch-cover elements utilized for closing openings such as hatchway of ships, and cars, comprising at least one endless controlled chain means extending along a plurality of hatchways, securing means for detachably and selectively connecting this chain to the hatch-cover elements to be simultaneously controlled and pertaining to at least one of said hatchways and control means for readjusting the connection between the control chain and each of said hatch-cover elements.

2. Control device as claimed in claim 1 wherein driving means are included in said control means, are provided on at least one cover element of a hatchway and are detachably connected to the said controlled chain.

3. Control device as claimed in claim 2 in which the said driving means comprise an arm on the hatch-cover and a carriage mounted on the side of the relevant hatch-cover and pivotal connecting means between said arm and carriage.

4. Device according to claim 3 wherein at least one driving member is associated with said carriage, means between said member and carriage for adjustably securing their relative position and further chain elements for detachably and selectively connecting said carriage and driving member with the control chain.

5. Device according to claim 4 wherein rack means constitute the said adjustable securing means between said driving member and carriage.

6. Control device as claimed in claim 5 in which said driving member consists of a bar of square cross-section adapted to slide longitudinally in the carriage, a set of teeth on said bar and on the carriage for mutual adjustable engagement and further means for locking the driving member in any selected position.

7. Control device as claimed in claim 6 in which key means are used as said locking means.

8. Control device as claimed in claim 5 in which the carriage includes two parallel members between which the said driving arm is located and pivoted.

9. Control device as claimed in claim 4 in which a plurality of securing means is provided, each of said securing means consisting of a connecting member extending through one of the chain elements of the control chain and connected at both ends to said further chain elements ensuring the connection with the said driving member and carriage.

10. Control device as claimed in claim 9 in which said securing means is of curved configuration, the inner radius being consistent with the outer radius of the chain elements belonging to the control chain.

11. Control device as claimed in claim 3 in which the pivotal connection between the said arm and carriage is disposed at the end of the said arm so that the traction component of the said further chains will lie essentially in the direction of movement of the control chain.

References Cited in the file of this patent

UNITED STATES PATENTS

| | | |
|---|---|---|
| 1,735,329 | MacGregor | Nov. 12, 1929 |
| 2,760,459 | Kummerman | Aug. 28, 1956 |